United States Patent
Moravec et al.

(10) Patent No.: US 10,604,707 B2
(45) Date of Patent: Mar. 31, 2020

(54) HYDROCARBON-IN-WATER PURIFICATION ANION-EXCHANGE SYSTEM

(71) Applicant: DONALDSON COMPANY, INC., Minneapolis, MN (US)

(72) Inventors: Davis B. Moravec, Minneapolis, MN (US); Andrew J. Dallas, Minneapolis, MN (US); Joseph M. Block, Minneapolis, MN (US); Bradly G. Hauser, Minneapolis, MN (US); Cullen E. Hall, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 113 days.

(21) Appl. No.: 15/558,610

(22) PCT Filed: Mar. 17, 2016

(86) PCT No.: PCT/US2016/022890
§ 371 (c)(1),
(2) Date: Sep. 15, 2017

(87) PCT Pub. No.: WO2016/149506
PCT Pub. Date: Sep. 22, 2016

(65) Prior Publication Data
US 2018/0079971 A1 Mar. 22, 2018

Related U.S. Application Data

(60) Provisional application No. 62/134,259, filed on Mar. 17, 2015.

(51) Int. Cl.
*C10G 33/06* (2006.01)
*B01J 20/20* (2006.01)
(Continued)

(52) U.S. Cl.
CPC ........... *C10G 33/06* (2013.01); *B01D 15/363* (2013.01); *B01D 61/10* (2013.01); *B01J 20/20* (2013.01);
(Continued)

(58) Field of Classification Search
CPC ........ C10G 33/06; C10G 33/08; C10G 25/02; C02F 1/40; C02F 1/42; C02F 1/283;
(Continued)

(56) References Cited

U.S. PATENT DOCUMENTS 583,382 A 5/1897 Lüer
2,534,907 A 12/1950 Ham et al.
(Continued)

FOREIGN PATENT DOCUMENTS

CN 1036030 A 10/1989
CN 1478727 A 3/2004
(Continued)

OTHER PUBLICATIONS

Abe et al., "Letter to the Editor: Spontaneous Breaking of Microemulsion by Surface-Modified Ion Exchange Resins," Mar. 15, 1990, *Journal of Colloid and Interface Science*, 135(2):598-600.
(Continued)

*Primary Examiner* — Joseph W Drodge
(74) *Attorney, Agent, or Firm* — Mueting, Raasch & Gebhardt, P.A.

(57) ABSTRACT

A hydrocarbon-in-water purification system includes an anion exchange stage having an anion exchange resin and an inlet and a water permeate outlet and a hydrocarbon outlet. The inlet is in fluid communication with a hydrocarbon-in-water emulsion source.

17 Claims, 2 Drawing Sheets

(51) Int. Cl.
| | |
|---|---|
| *B01J 20/28* | (2006.01) |
| *B01J 41/05* | (2017.01) |
| *B01D 15/36* | (2006.01) |
| *B01D 61/10* | (2006.01) |
| *C10G 25/02* | (2006.01) |
| *C10G 33/08* | (2006.01) |
| *C02F 1/28* | (2006.01) |
| *C02F 1/32* | (2006.01) |
| *C02F 1/50* | (2006.01) |
| *C02F 1/78* | (2006.01) |
| *C02F 1/40* | (2006.01) |
| *C02F 1/42* | (2006.01) |
| *C02F 101/32* | (2006.01) |
| *C02F 103/36* | (2006.01) |

(52) U.S. Cl.
CPC ......... *B01J 20/28057* (2013.01); *B01J 41/05* (2017.01); *C02F 1/40* (2013.01); *C02F 1/42* (2013.01); *C10G 25/02* (2013.01); *C10G 33/08* (2013.01); *B01J 2204/005* (2013.01); *C02F 1/283* (2013.01); *C02F 1/32* (2013.01); *C02F 1/50* (2013.01); *C02F 1/78* (2013.01); *C02F 2001/422* (2013.01); *C02F 2101/32* (2013.01); *C02F 2101/325* (2013.01); *C02F 2103/365* (2013.01); *C02F 2209/445* (2013.01)

(58) Field of Classification Search
CPC .......... C02F 1/78; C02F 1/32; C02F 2101/32; C02F 2101/325; C02F 1/50; C02F 2103/365; C02F 2209/445; C02F 2001/422; B01D 15/363; B01D 61/10; B01J 41/05; B01J 20/20; B01J 20/28057; B01J 2204/005
USPC .... 210/263, 264, 266, 502.1, 683, 691, 692, 210/693, 694, 798, 908; 516/135, 136, 516/141, 143
See application file for complete search history.

(56) References Cited

U.S. PATENT DOCUMENTS

| | | | |
|---|---|---|---|
| 3,017,347 A | 1/1962 | Kratz | |
| 3,704,990 A * | 12/1972 | Sarem | C09K 8/588 166/400 |
| 3,729,410 A * | 4/1973 | Abadie | B01D 17/0202 210/671 |
| 4,105,549 A | 8/1978 | Kakumoto et al. | |
| 4,368,716 A | 1/1983 | Davis | |
| 4,534,865 A | 8/1985 | Sundberg et al. | |
| 4,676,908 A * | 6/1987 | Ciepiela | B01D 61/025 204/524 |
| 4,790,941 A | 12/1988 | Taylor | |
| 5,094,747 A | 3/1992 | Johnson | |
| 5,178,769 A | 1/1993 | Simpson et al. | |
| 5,236,595 A * | 8/1993 | Wang | B01J 39/04 210/141 |
| 5,350,527 A * | 9/1994 | Kitko | B01D 17/02 210/804 |
| 5,462,785 A | 10/1995 | Holland | |
| 5,549,832 A * | 8/1996 | Ische | C09K 5/20 210/694 |
| 5,692,461 A * | 12/1997 | Crovato | F01P 11/06 123/41.14 |
| 5,900,153 A | 5/1999 | Sanford | |
| 5,922,198 A * | 7/1999 | Kelly | B01J 39/04 210/241 |
| 6,027,653 A | 2/2000 | Holland | |
| 6,180,010 B1 | 1/2001 | Alper | |
| 6,416,670 B1 * | 7/2002 | Cummings | B01D 15/00 210/673 |
| 6,893,571 B2 | 5/2005 | Harenbrock et al. | |
| 7,638,047 B1 | 12/2009 | Jones | |
| 7,850,846 B2 | 12/2010 | De La Azuela et al. | |
| 8,388,834 B2 | 3/2013 | Rösgen et al. | |
| 8,636,900 B2 | 1/2014 | Braunheim et al. | |
| 9,593,032 B2 * | 3/2017 | Moore | C02F 1/283 |
| 2002/0153324 A1 | 10/2002 | Gerard | |
| 2003/0114350 A1 | 6/2003 | Schmitt et al. | |
| 2004/0011741 A1 | 1/2004 | Hirata et al. | |
| 2008/0083666 A1 * | 4/2008 | Brown | C02F 9/00 210/202 |
| 2008/0105620 A1 * | 5/2008 | Hicks | C02F 9/005 210/681 |
| 2008/0302104 A1 | 12/2008 | Hwang | |
| 2009/0084734 A1 | 4/2009 | Yencho | |
| 2010/0096304 A1 | 4/2010 | Gänswein et al. | |
| 2011/0309022 A1 * | 12/2011 | Briggs | B01D 17/0202 210/663 |
| 2012/0091055 A1 | 4/2012 | Torras-Pique et al. | |
| 2012/0241385 A1 | 9/2012 | McCarthy et al. | |
| 2013/0001155 A1 * | 1/2013 | Neubauer | B01D 39/1623 210/489 |
| 2013/0056204 A1 | 3/2013 | Ray et al. | |
| 2013/0299404 A1 | 11/2013 | Nakamura | |
| 2013/0313191 A1 * | 11/2013 | Wolf | C02F 9/00 210/638 |
| 2014/0034577 A1 | 2/2014 | Trobaugh et al. | |
| 2014/0034580 A1 * | 2/2014 | Chen | B01D 36/003 210/708 |
| 2014/0066668 A1 * | 3/2014 | Lorenz, II | C07C 29/76 568/913 |
| 2014/0066680 A1 | 3/2014 | Miao et al. | |
| 2014/0221688 A1 | 8/2014 | Corredores et al. | |
| 2015/0136696 A1 | 5/2015 | Bedard et al. | |
| 2015/0225655 A1 | 8/2015 | Adams et al. | |
| 2015/0315454 A1 * | 11/2015 | Perez-Cordova | C09K 8/265 507/103 |
| 2015/0332181 A1 * | 11/2015 | Underwood | C02F 9/00 705/7.12 |
| 2017/0021295 A1 | 1/2017 | Willems et al. | |

FOREIGN PATENT DOCUMENTS

| | | |
|---|---|---|
| CN | 1180686 C | 12/2004 |
| CN | 101939261 A | 1/2011 |
| CN | 102596825 A | 7/2012 |
| EP | 2 878 352 A1 | 6/2015 |
| GB | 826144 * | 12/1959 |
| GB | 826144 A | 12/1959 |
| GB | 1496034 A | 12/1977 |
| JP | S49-051766 | 5/1974 |
| JP | S54-87679 A | 7/1979 |
| JP | S54-104654 | 8/1979 |
| JP | S57-059053 | 4/1982 |
| JP | 2005-199260 | 7/2005 |
| JP | 2010-501769 A | 1/2010 |
| WO | WO 2016/149506 A1 | 9/2016 |
| WO | WO 2016/149512 A4 | 9/2016 |

OTHER PUBLICATIONS

Donaldson Fuel Filtration Product Brochure. No Date Listed. 78 pages.
International Patent Application No. PCT/US2016/22890, filed Mar. 17, 2016; International Search Report / Written Opinion dated Jun. 9, 2016; 13 pages.
International Patent Application No. PCT/US2016/22901, filed Mar. 17, 2016; International Search Report / Written Opinion dated Aug. 5, 2016; 16 pages.
European Patent Application No. 16765755.0, filed Mar. 17, 2016, Extended European Search Report dated Sep. 5, 2018, 8 pages.
Chinese Patent Application No. 201680015842.1, filed Mar. 17, 2015; Office Action dated Jul. 15, 2019, English language translation included.
European Patent Application No. 16765751.9, filed Mar. 17, 2016, Extended European Search Report dated Aug. 20, 2018, 8 pages.

(56) References Cited

OTHER PUBLICATIONS

Johannsen et al., "Water, 2. Treatment by Adsorption Processes", *Ullman's Encyclopedia of Industrial Chemistry*, vol. 39, Oct. 15, 2011, Wiley, VCH, Weinheim, p. 41-49.
Japanese Patent Application No. 2017-549205, filed Mar. 17, 2015, Office Action dated Jan. 6, 2020, English translation included.

* cited by examiner

HYDROCARBON-IN-WATER PURIFICATION ANION-EXCHANGE SYSTEM

This application is the § 371 U.S. National Stage of International Application No. PCT/US2016/022890, filed 17 Mar. 2016, which claims the benefit of U.S. Provisional Application No. 62/134,259, filed 17 Mar. 2015, the disclosures of which are incorporated by reference herein in their entireties.

The present disclosure relates to hydrocarbon-in-water purification systems and particularly to systems that break hydrocarbon-in-water emulsions and remove or separate hydrocarbons from water.

Water contamination in fuel is a concern as it affects the performance and operation of engines. Water contamination can cause various problems including fuel filter plugging, fuel starvation, damage of engine components through cavitation and corrosion, and promotion of microbiological growth, for example.

Various devices have been employed to reduce the amount of water contamination in fuel. By way of example, coalescing and separating devices have been employed to first cause the emulsified water to coalesce into larger droplets and then remove the enlarged droplets from the fuel stream. A removed or drained hydrocarbon-in-water emulsion stream is an output from this water from fuel separator system.

Water and oil contamination in compressed air is a concern as it affects the whole compressed air system: corrosion in pipelines valves and machines, oil in chemical, pharmaceutical and food packaging processes and so forth. By way of example, coalescing and separating devices have been employed to first cause the emulsified water and the oil and water droplets, in compressed air, to coalesce into larger droplets and then remove the enlarged droplets from the compressed air stream. A removed or drained hydrocarbon-in-water dispersion or emulsion stream is an output from this 'oil/water-condensate' from compressed air separator system.

Recent efforts have been focused on reducing air pollution caused by the combustion of hydrocarbon fluids. Sulphur contributes directly to the pollution caused by the combustion of diesel fuels. Diesel fuels have been refined with reduced amounts of sulphur to meet diesel engine emission control regulations. However, these low-sulphur diesel fuels have necessitated the use of other additives. By way of example, surfactants have been added to low-sulphur diesel fuels to maintain sufficient lubricity of the diesel fuel for the engine. Surfactants have also the effect of stabilizing hydrocarbon-in-water emulsions or dispersions as they lower the interfacial tension between water and hydrocarbons.

SUMMARY

The present disclosure relates to hydrocarbon-in-water purification systems and particularly to systems that break hydrocarbon-in-water emulsions and remove hydrocarbons from water, among other aspects.

In many embodiments the a hydrocarbon-in-water purification system includes a hydrocarbon-in-water purification system having an anion exchange stage having a basic or strongly basic anion exchange resin and an inlet and a water permeate outlet and a hydrocarbon outlet. The inlet is in fluid communication with a hydrocarbon-in-water emulsion source.

In further embodiments, an engine fuel and water separation system includes a fuel and water separator system fluidly connected to an engine fuel line and having a water drain outlet, and a hydrocarbon-in-water purification system, as described herein, in fluid communication with the water drain outlet.

In further embodiments, an oil/water separator system includes an oil/water reservoir vessel, and a hydrocarbon-in-water purification system, as described herein, fluidly connected to the oil/water reservoir vessel.

In still further embodiments, a method includes passing a hydrocarbon-in-water dispersion or emulsion through an anion exchange element having a basic or strongly basic anion exchange resin to break the emulsion and allow the hydrocarbon to separate from a permeate that is substantially water, and then removing the permeate from the anion exchange element.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles or systems described herein may be used in a number of directions and orientations.

The term "hydrocarbon" refers to oil or fuel materials that are primarily formed of saturated or unsaturated carbon based molecules.

The phrase "hydrocarbon-in-water emulsion" refers to an emulsion where water is the continuous phase and hydrocarbon is the dispersed or discontinuous phase. The "hydrocarbon-in-water emulsion" described herein include hydrocarbon droplets having an average diameter greater than 5 micrometers or in a range from 5 to 25 micrometers. The "hydrocarbon-in-water emulsions" described herein are not thermodynamically stable. The "hydrocarbon-in-water emulsions" described herein have some degree of kinetic stability. Hydrocarbon droplets between 5 and 15 micrometers have significant kinetic stability.

The term "emulsion" refers to a fluid system in which liquid droplets are dispersed in a second liquid and the two liquids are immiscible.

The term "absorption" refers to the removal process of hydrocarbons from water and includes absorption, adsorption, and the like mechanisms of removal of hydrocarbons from water.

The phrases "high capacity hydrocarbon absorber material" and "high capacity material" refer to a material that does not need to clean water to the intended cleanliness, but instead has properties that lead to high saturation capacities. For example, when challenged with 2500 ppm B5-in-water emulsion or dispersion (B5=5% biodiesel blend) the saturation capacity of these materials is preferably greater than 750 mg of hydrocarbon per gram of material or greater than 1000 mg of hydrocarbon per gram of material. Preferred saturation capacities will vary depending on the challenge fluid concentration and makeup.

The phrase "polishing hydrocarbon absorber material" and "polishing material" refer to a material that can purify water down to the intended cleanliness over a wide range of incoming challenge water concentrations. Preferably, these materials have high loading characteristics at the intended target cleanliness. For example, when challenged with 2500 ppm B5-in-water emulsions or dispersions, with a target cleanliness of 2 ppm, these materials have a preferred loading or polishing capacity of greater than 25 mg of hydrocarbons per gram of material or greater than 50 mg of hydrocarbon per gram of material. Preferred loading characteristics depend on challenge fluid concentration and makeup, and on target cleanliness.

The present disclosure describes water purification systems and particularly to systems that break hydrocarbon-in-water emulsions and remove or separate hydrocarbons from water, among other aspects. In particular, an anion exchange resin breaks the emulsion and allows the hydrocarbon to separate from a permeate that is substantially water. Permeate may then be passed through a hydrocarbon absorber stage to adsorb hydrocarbon and form a polished water stream. The polished water stream can have less than 5 ppm of hydrocarbons or less than 2 ppm or hydrocarbons or less than 1 ppm of hydrocarbons. Hydrocarbons include fuels such as gas or diesel (including bio-diesel) or natural gas or propane or oil. In many embodiments, the anion exchange resin is a basic or strongly basic anion exchange resin. In many embodiments the absorber stage is activated carbon. While the present disclosure is not so limited, an appreciation of various aspects of the disclosure will be gained through a discussion of the examples provided below.

Fuel cleanliness requirements for fuel injection systems are demanding in order to ensure reliable engine performance. To a large degree, fuel filtration is responsible for meeting the fuel cleanliness requirements associated with the control of abrasive particles and non-dissolved water. These filters can coalesce at least a portion of the entrained water from the fuel stream and form a fuel-in-water dispersion or emulsion waste stream.

Fuel may contain anionic surfactants. Furthermore, exposure of fuel (especially biofuel like biodiesel) to water results in the formation of additional anionic surfactants. An example of this process is the reaction of carboxylic acids from the biodiesel production process with dissolved metal ions to form anionic surfactants (e.g., soaps). These soaps are more water soluble than the carboxylic acids and can encourage and stabilize hydrocarbon-in-fuel emulsions having at least 500 ppm hydrocarbon content.

Contacting stable hydrocarbon-in-water emulsions with an anion exchange material may exchange the carboxylic anion portion of the soap with a water soluble anion such as chloride, for example forming a metal chloride (such as sodium chloride), effectively removing the soap material from the hydrocarbon-in-water emulsions (or dispersions). Once the soap material is removed or reduced, the hydrocarbon-in-water emulsion destabilizes and allows the water and fuel phases to separate based on their specific gravity differences.

Figure 1:
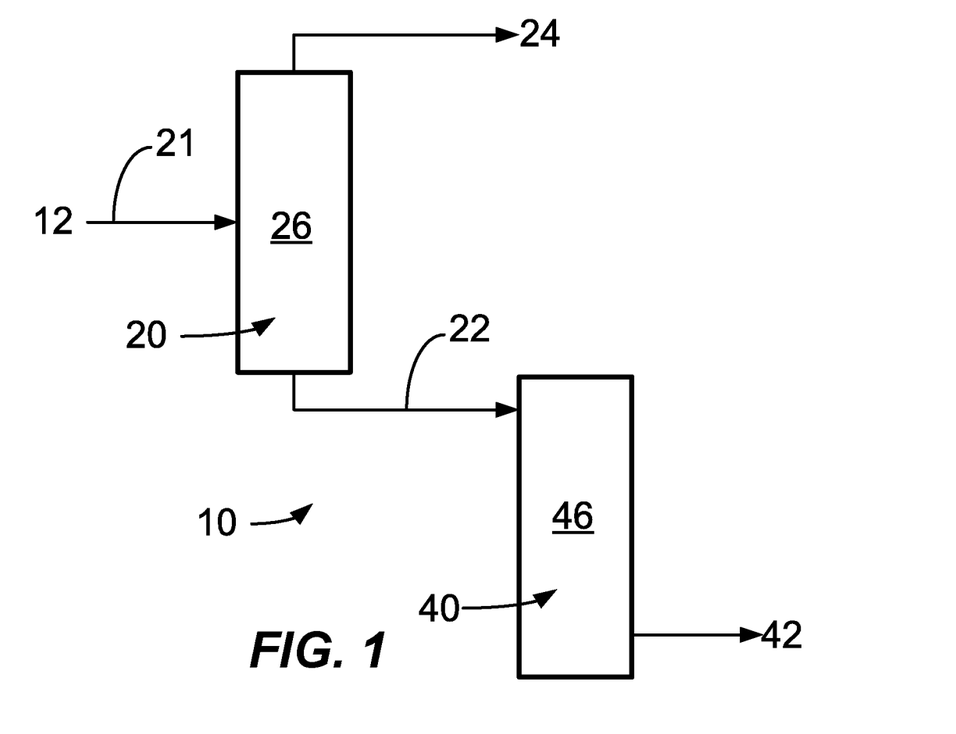
FIG. 1 is a schematic diagram view of a hydrocarbon-in-water purification system.

FIG. 1 is a schematic diagram view of a hydrocarbon-in-water purification system 10. The hydrocarbon-in-water purification system 10 includes an anion exchange stage 20 containing an anion exchange resin 26 and an inlet 21 configured to receive a hydrocarbon-in-water emulsion 12 from a hydrocarbon-in-water emulsion source. The anion exchange resin 26 assists in breaking the hydrocarbon-in-water emulsion 12 allowing the water and hydrocarbon phases to separate based on their specific gravity differences. A substantially hydrocarbon stream 24 and a substantially water permeate stream 22 exits the anion exchange stage 20. A hydrocarbon absorber stage 40 may be in liquid communication and downstream of the anion exchange stage 20. Permeate 22 may enter hydrocarbon absorber stage 40 and a purified water stream 42 exits the hydrocarbon absorber stage 40.

Figure 2:
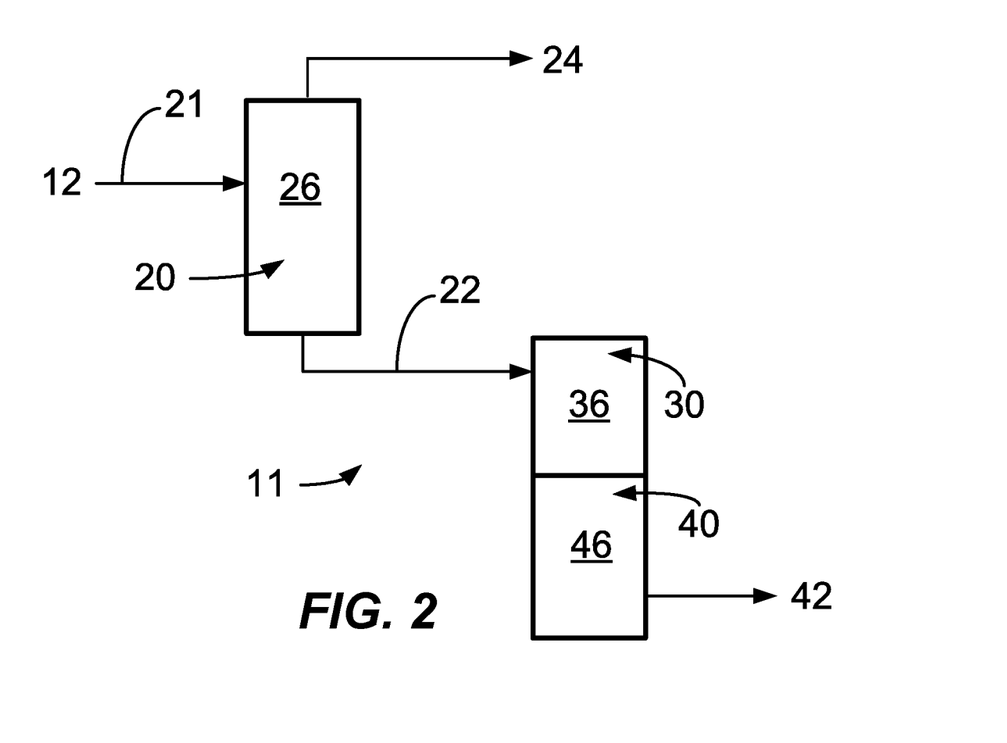
FIG. 2 is a schematic diagram view of another hydrocarbon-in-water purification system.

FIG. 2 is a schematic diagram view of another hydrocarbon-in-water purification system 11. In many embodiments the hydrocarbon-in-water purification system 11 includes an anion exchange stage 20 containing an anion exchange resin 26 and an inlet 21 configured to receive a hydrocarbon-in-water emulsion 12 from a hydrocarbon-in-water emulsion source. The anion exchange resin 26 assists in breaking the hydrocarbon-in-water emulsion 12 allowing the water and hydrocarbon phases to separate based on their specific gravity differences. A substantially hydrocarbon stream 24 and substantially water permeate stream 22 exits the anion exchange stage 20. A high capacity hydrocarbon absorber stage 30 may be in liquid communication and downstream of the anion exchange stage 20. A polishing hydrocarbon absorber stage 40 may be liquid communication and downstream of the high capacity high capacity hydrocarbon absorber stage 30. Permeate 22 may enter the high capacity hydrocarbon absorber stage 30 and then the polishing hydrocarbon absorber stage 40 and a purified water stream 42 then may exit the polishing hydrocarbon absorber stage 40.

In many embodiments the hydrocarbon-in-water dispersion source is fuel filter element that can coalesce water and form a hydrocarbon-in-water emulsion stream. The fuel filter element forms a portion of a fuel system such as those used in a diesel engine such as a vehicle engine, for example.

This hydrocarbon-in-water emulsion stream may have hydrocarbon liquid droplets suspended in water. This hydrocarbon-in-water emulsion may not be thermodynamically stable but may exhibit kinetic stability. These hydrocarbon liquid droplets suspended in water may have an average droplet size or diameter greater than 5 micrometers or in a range from 5 to 25 micrometers. The hydrocarbon may be present in the hydrocarbon-in-water emulsion stream in an amount greater than 500 ppm or at least 1000 ppm or at least 5,000 ppm hydrocarbons.

The hydrocarbon-in-water emulsion stream may include a surfactant. The surfactant may be present in the hydrocarbon-in-water emulsion in any emulsion stabilizing amount such as 1 ppm or greater or 10 ppm or greater or 50 ppm or greater or 100 ppm or greater. In some instances the surfactant may be present in the hydrocarbon-in-water emulsion in an amount from 1 to 100 ppm or from 5 to 50 ppm.

The hydrocarbon-in-water emulsion stream may include a surfactant may include an anionic surfactant. Anionic surfactants are surfactants in which the polar portion of the molecule contains an anionic functional group (or groups). Anionic functional groups include carboxylate, sulfate, sulfonate, and phosphate. Anionic surfactants include, for example, ammonium lauryl sulfate, sodium dodecyl sulfate, sodium dodecylbenzenesulfonate, sodium laurate, sodium laureth sulfate, sodium lauroyl sarcosinate, sodium myreth sulfate, sodium pareth sulfate, sodium stearate, potassium lauryl sulfate, and other linear alkylbenzene sulfonates and primary alkylbenzene sulfonates. Other anionic surfactants include, for example, salts of pefluorobutanesulfonic acid, pefluorononanoic acid, perfluorooctanesulfonic acid, pefluorooctanoic acid.

Salts of carboxylic acids, especially those found in diesel fuel as biofuel components or fuel and oil additive packages, may act as surfactants. These include salts of myristic acid, pentadecylic acid, palmitic acid, margaric acid, stearic acid, oleic acid, linoleic acid, and α-linoleic acid. Molecules with additional degrees of unsaturation are also included.

In some embodiments, the hydrocarbon-in-water purification system 10, 11 can include an antimicrobial agent. For example, one or more of the anion exchange stage 20, polishing hydrocarbon absorber stage 40, or the high capacity hydrocarbon absorber stage 30 can include an antimicrobial agent. The antimicrobial agent can be any useful material or compound that inhibits microbe growth or kills microbes. Exemplary antimicrobial agents include silver, copper, organic biocides (such as quaternary amines, for example), ozone, or UV light.

Figure 3:
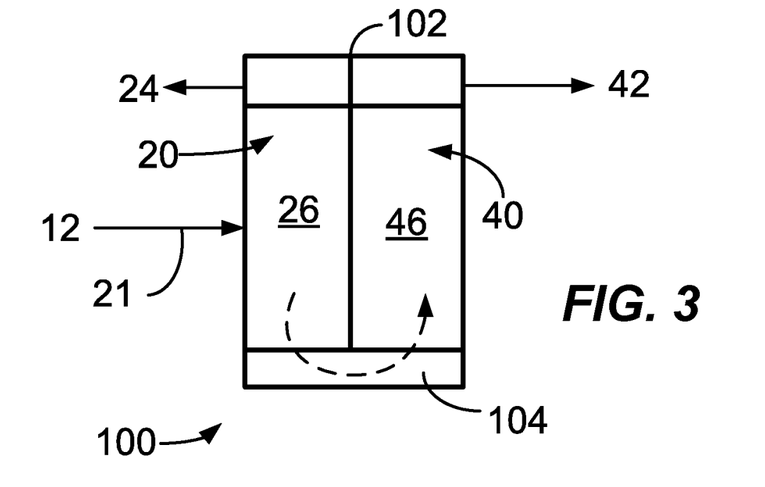
FIG. 3 is a schematic diagram view of a skimmer-type hydrocarbon-in-water purification system.

FIG. 3 is a schematic diagram view of a skimmer-type hydrocarbon-in-water purification system 100. This hydrocarbon-in-water purification system 100 includes an anion exchange stage 20 containing an anion exchange resin 26 and an inlet 21 configured to receive a hydrocarbon-in-water emulsion 12 from a hydrocarbon-in-water emulsion source (such as an oil/water reservoir vessel). The anion exchange resin 26 assists in breaking the hydrocarbon-in-water emulsion 12 allowing the water and hydrocarbon phases to separate based on their specific gravity differences. A substantially hydrocarbon stream 24 can be skimmed off the top of the anion exchange stage 20 and a substantially water permeate stream exits the anion exchange stage 20 and flows into a hydrocarbon absorber stage 40 via a channel 104 at the bottom of the anion exchange stage 20. The hydrocarbon absorber stage 40 is in liquid communication and downstream of the anion exchange stage 20 via the channel 104. Permeate enters hydrocarbon absorber stage 40 from the channel 104 and a purified water stream 42 exits the hydrocarbon absorber stage 40.

Figure 4:
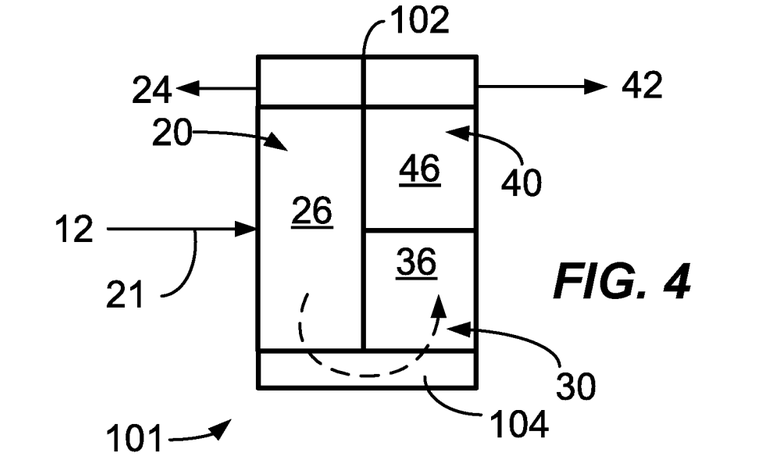
FIG. 4 is a schematic diagram view of another skimmer-type hydrocarbon-in-water purification system.

FIG. 4 is a schematic diagram view of another skimmer-type hydrocarbon-in-water purification system 101. In many embodiments the hydrocarbon-in-water purification system 101 includes an anion exchange stage 20 containing an anion exchange resin 26 and an inlet 21 configured to receive a hydrocarbon-in-water emulsion 12 from a hydrocarbon-in-water emulsion source (such as an oil/water reservoir vessel). The anion exchange resin 26 assists in breaking the hydrocarbon-in-water emulsion 12 allowing the water and hydrocarbon phases to separate based on their specific gravity differences. A substantially hydrocarbon stream 24 can be skimmed off the top of the anion exchange stage 20 and a substantially water permeate stream exits the anion exchange stage 20 and flows into a high capacity hydrocarbon absorber stage 30 via a channel 104 at the bottom of the anion exchange stage 20. The high capacity hydrocarbon absorber stage 30 is in liquid communication and downstream of the anion exchange stage 20 via the channel 104. A polishing hydrocarbon absorber stage 40 is in liquid communication and downstream of the high capacity hydrocarbon absorber stage 30. Permeate enters the high capacity hydrocarbon absorber stage 30 from the channel 104 and then the polishing hydrocarbon absorber stage 40 and a purified water stream 42 exits the hydrocarbon absorber stage 40.

A housing 102 can contain the hydrocarbon-in-water purification system 100, 101. In many embodiments the hydrocarbon-in-water dispersion source is an oil/water reservoir vessel. In many of these embodiments the oil/water reservoir vessel forms a portion of a compressor system. In some embodiments a housing 102 contains the anion exchange resin 26.

In some embodiments, the hydrocarbon-in-water purification system 100, 101 can include an antimicrobial agent. For example, one or more of the anion exchange stage 20, hydrocarbon absorber stage 40, or the high capacity hydrocarbon absorber stage 30 can include an antimicrobial agent. The antimicrobial agent can be any useful material or compound that inhibits microbe growth or kills microbes. Exemplary antimicrobial agents include silver, copper, organic biocides (such as quaternary amines, for example), ozone, or UV light.

In another illustrative embodiment, the hydrocarbon-in-water purification system may include a volume of anion exchange resin and a volume of hydrocarbon-in-water emulsion separated by a membrane such as a water permeable layer or element. Water and water soluble components diffuse through the membrane. Over time the water-soluble surfactants diffuse though the membrane and contact the anion exchange resin. This may have the same effect for breaking emulsions as one where the emulsion is in contact or flowing through the volume of anion exchange resin.

In many embodiments, the hydrocarbon-in-water emulsion has at least 500 ppm or at least 1000 ppm or at least 5,000 ppm hydrocarbons. The permeate has less than 500 ppm or less and 250 ppm or less than 100 ppm dissolved hydrocarbons. The polished water stream includes less than 5 ppm hydrocarbons or less than 2 ppm hydrocarbons, or less than 1 ppm hydrocarbons.

Anion Exchange

The term "anion exchange resin" refers to a substance or material that contains a functional group for anion exchange. Anion exchange can be in the form of beads. Preferably the anion exchange resin is a basic anion exchange resin (preferably in the hydroxide or halogen form). In many of these embodiments the anion exchange resin is strongly basic.

Examples of anion (or anionic) exchange resins include, but are not limited to, DOWEX MARATHON A, DOWEX MARATHON A MB, DOWEX MARATHON A LB, DOWEX MARATHON A2, DOWEX 11, DOWEX SBR-P, DOWEX SBR, DOWEX SAR, DOWEX MSA-1, DOWEX MSA-2, DOWEX MONOSPHERE 550A, DOWEX SBR-PC, DOWEX SBR C, DOWEX MSA-1C, DOWEX MARATHON WBA, DOWEX WGR-2, DOWEX MWA-1, DOWEX IF-59 PS, or DOWEX MONOSPHERE 600BB, which are manufactured by the Dow Chemical Company, AMBERLITE IRA958 C1, AMBERLITE IRA404 C1, AMBERLITE IRA410 C1, AMBERJET 4600 C1, AMBERJET 4200 C1, AMBERLITE IRA67, AMBERLITE IR96, AMBERLITE 4200 C1, AMBERLITE IRA402 C1, AMBERLITE IRA900 C1, AMBERLITE IRA910 C1, AMBERLITE IRA458 C1, AMBERLITE IRA478RF C1, AMBERLITE IRA67RF, AMBERLITE IRA96RF, AMBERLITE IRA458RF C1, AMBERLITE RF14, AMBERLITE IRA96SB, AMBERJET 4400 C1, AMBERJET 4400 OH, or AMBERSEP 900 OH, which are manufactured by Rohm & Haas, or PUROLITE A200, PUROLITE A300, PUROLITE A400, PUROLITE A420S, PUROLITE A500, PUROLITE A500P, PUROLITE A505, PUROLITE A510, PUROLITE A600, PUROLITE A850, PUROLITE A860, PUROLITE A870, PUROLITE SGA400, PUROLITE SGA600, PUROLITE A501P, or PUROLITE S108, which are manufactured by Purolite.

The anionic exchange resin may be a stongly-basic resin, preferably a polystyrene containing a quatenary ammonium functional group. Strong base anion exchange resins are surprisingly efficient since the soaps that stabilize the fuel-in-water emulsion are organic anions that are exchanged during anion exchange to remove the surfactant leaving behind a metal salt. In many embodiments these strong base anion exchange resins are quatenary ammonium, macro-porous polystyrene cross-linked with divinylbenzene. Acrylate versions of these strong base anion exchange resins are also useful. These resins are commercially available. Strong base resins can be preferred because of their ability to pull organic acid in dissociated form from the soap to leave behind a metal salt (for example, NaCl). In some embodiments, weak-base resins can be useful, such as PUROLITE A100 and A03.

Strongly-basic anion exchange resin may also include styrene-divinyl benzene copolymers containing quaternary ammonium groups such as tetra alkyl ammonium hydroxide groups. Representative products of this nature are sold commercially under trade names such as DOWEX 1-X10, DOWEX 2-XB, AMBERLITE IRA-410, AMBERLITE IRA-4015, AMBERLITE IRA-400, AMBERLITE A-26, AMBERLITE IRA-93, AMBERLITE IRA-94, AMBERLITE IRA-900, AMBERLITE IRA-904, DOWEX MSA-1, DOWEX SA-2, etc.

Anionic exchange resins may possess amino or tertiary amine functionality and may be suitable for binding carboxylic ions found in the soaps. Non-limiting examples of resins based on crosslinked organic polymers include DOWEX MONOSPHERE 66, DOWEX MONOSPHERE 77, DOWEX MARATHON Wba, DOWEX MARATHON Wba-2, DOWEX UPCORE MONO Wb-500, DOWEX 66, DOWEX M-43, AMBERLITE Fpa53, AMBERLITE FPA55, AMBERLITE IRA67, AMBERLITE Ira96, PUROLITE A-100, PUROLITE A-103, PUROLITE A847, DIAION Wa10, DIAION Wa21j, DIAION Wa30, SEPABEAD FP-DA, LEWATIT MONOPLUS Mp64, and LEWATIT Vp Oc 1072.

Hydrocarbon Absorbing Material

A hydrocarbon absorbing material includes any material capable of absorbing hydrocarbons. Exemplary hydrocarbon absorbing material includes polymeric material, activated carbon, or both. The hydrocarbon-in-water composition or water permeate from the anion exchange stage may first contact a high capacity hydrocarbon absorbing material prior to contacting a polishing hydrocarbon absorbing material. It has been found that the overall life of the hydrocarbon absorbing element can be prolonged by having the high capacity hydrocarbon absorbing material upstream of the polishing hydrocarbon absorbing material.

The relationship between equilibrium concentration and carbon loading can be described by an adsorption isotherm. Three of the most widely used models of adsorption are the Freundlich, Langmuir, and BET (Brunauer, Emmett, and Teller) isotherms. Of these, the empirical Freundlich Isotherm expression best describes the loading behavior of activated carbon over a wide range of challenge conditions and loading amounts. The Freundlich isotherm expression is:

$$q = \frac{x}{m} = K_f c_e^{\frac{1}{n}}$$

where q is the adsorbent loading in milli-grams of adsorbate per gram of adsorbent (x/m), $c_e$ is the equilibrium adsorbate concentration in solution, and $K_f$ and 1/n are the isotherm parameters that are dependent on the adsorbate, adsorbent, and temperature.

The Freundlich Isotherm expression can be used to determine the adsorbent loading at a particular target equilibrium adsorbate concentration. When the equilibrium adsorbate concentration ($c_e$) is equal to the incoming adsorbate concentration ($c_o$) the material is exhausted. The loading capacity under these conditions is called the saturation capacity or $q_{sat}$. The saturation capacity of a material varies with different incoming adsorbate concentrations. A material that has high saturation capacity is called a high capacity hydrocarbon absorber material or high capacity material.

In most purification applications the target adsorbate concentration leaving the element ($c_t$) is less than the incoming adsorbate concentration. In this case, the adsorbent loading determined from the Freundlich Isotherm expression at the intended target adsorbate concentration is deemed the polishing capacity or $q_t$. The polishing capacity of a material varies with different incoming adsorbate concentrations and target adsorbate concentrations. The polishing capacity is generally less than the saturation capacity. A material that has high polishing capacity is called a polishing hydrocarbon absorber material or polishing material.

Preferably, the high capacity hydrocarbon absorber material has a greater saturation capacity ($q_{sat}$) than the polishing hydrocarbon absorber material and the polishing hydrocarbon absorber material has a greater polishing capacity ($q_t$) than the high capacity hydrocarbon absorber material. The saturation capacity ($q_{sat}$) and polishing capacity ($q_t$) is determined with the same incoming adsorbate concentration.

A hydrocarbon-in-water purification system containing separate sections of a high capacity material followed by a polishing material has an increased lifetime over a similar sized system of a single material. In particular, a filter housing containing separate sections of a high capacity material followed by a polishing material can have an increased lifetime over a similar sized filter housing of a single material. The high capacity material and the polishing material are configured in serial flow orientation to each other where the polishing material is downstream from the high capacity material.

Activated carbon is a fine-grained carbon with an extremely large surface area and a highly porous structure. Its adsorption capacity is therefore especially high and is especially pronounced for hydrocarbons in particular. Activated carbon consists primarily of carbon (mostly >90%) with a strongly porous structure. In addition, the internal surface area of the activated carbon is between 500 and 2000 m²/g carbon, which explains the high adsorption capacity of the activated carbon.

A "high capacity" activated carbon is a material that has a loading at saturation ($q_{hat}$) of at least 25% or at least 50% or at least 75% greater than a control sample of activated carbon (referred to herein as polishing hydrocarbon absorbing material). Generally, the high capacity hydrocarbon absorber material has a greater saturation capacity ($q_{sat}$) than the polishing hydrocarbon absorber material.

In some embodiments the high capacity hydrocarbon absorbing polymeric material includes hydrocarbon absorbing polymeric polyethylene, polypropylene, polyurethane, polyester, and combinations thereof. These absorbing polymeric materials can be in the form of a non-woven fabric layer, nanofiber layer, a sponge or polymer foam element or layer. In other embodiments the high capacity hydrocarbon absorbing material is an activated carbon. In some embodiments, the high capacity hydrocarbon absorbing material includes both a high capacity hydrocarbon absorbing polymeric material and a high capacity hydrocarbon absorbing activated carbon material.

The high capacity hydrocarbon absorbing material includes one or more or two or more different types or kinds of high capacity hydrocarbon absorbing material. The two or more high capacity hydrocarbon absorbing materials may be mixed together within a single volume or separated from each other by a divider or spacer element where they are in serial flow orientation to each other.

In some embodiments the high capacity hydrocarbon absorbing material includes two or more high capacity hydrocarbon absorbing activated carbon materials. The two or more high capacity hydrocarbon absorbing activated carbon material may be mixed together within a single volume or separated from each other by a divider or spacer element where they are in serial flow orientation to each other.

In some embodiments the high capacity hydrocarbon absorbing material includes two or more high capacity hydrocarbon absorbing polymeric materials. The two or more high capacity hydrocarbon absorbing polymeric materials may be mixed together within a single volume or separated from each other by a divider or spacer element where they are in serial flow orientation to each other.

In some embodiments the high capacity hydrocarbon absorbing material includes a high capacity hydrocarbon absorbing polymeric material and a high capacity hydrocarbon absorbing activated carbon material. The high capacity hydrocarbon absorbing polymeric material and the high capacity hydrocarbon absorbing activated carbon material may be mixed together within a single volume or separated from each other by a divider or spacer element where they are in serial flow orientation to each other. In these embodiments, the high capacity hydrocarbon absorbing polymeric material may represent from 10 to 90 wt % of the total high capacity hydrocarbon absorbing material and a high capacity hydrocarbon absorbing activated carbon material may represent from 90 to 10% of the total high capacity hydrocarbon absorbing material. The high capacity hydrocarbon absorbing polymeric material may represent from 25 to 50 wt % of the total high capacity hydrocarbon absorbing material and a high capacity hydrocarbon absorbing activated carbon material may represent from 75 to 50% of the total high capacity hydrocarbon absorbing material. The high capacity hydrocarbon absorbing polymeric material may represent from 75 to 50 wt % of the total high capacity hydrocarbon absorbing material and a high capacity hydrocarbon absorbing activated carbon material may represent from 25 to 50% of the total high capacity hydrocarbon absorbing material.

In many embodiments the polishing hydrocarbon absorber material is an activated carbon. In some embodiments the polishing hydrocarbon absorbing material includes two or more polishing hydrocarbon absorbing activated carbon materials. The two or more polishing hydrocarbon absorbing activated carbon material may be mixed together within a single volume or separated from each other by a divider or spacer element where they are in serial flow orientation to each other.

It is understood that the high capacity hydrocarbon absorbing material and the polishing hydrocarbon absorber material are different materials. For example both the hydrocarbon absorbing material and the hydrocarbon absorber material can be activated carbon, however, they are different types of activated carbon that have different absorption properties. Generally, the polishing activated carbon has a greater polishing capacity ($q_t$) than the high capacity hydrocarbon absorber material.

In some embodiments the hydrocarbon-in-water purification system has about an equal weight or volume amount of high capacity hydrocarbon absorber material as compared to polishing hydrocarbon absorber material. The high capacity hydrocarbon absorber material represents from 45 to 55 wt % of the total absorber material (contained within the hydrocarbon-in-water purification system) and the polishing hydrocarbon absorber material is about 55% to 45% of the total absorber material.

In some embodiments having a greater wt % of high capacity hydrocarbon absorber material as compared to polishing hydrocarbon absorber material has been shown to improve the lifetime of the overall hydrocarbon in water purification system. In some of these embodiments the high capacity hydrocarbon absorber material represents from 55% to 95% wt of the total absorber material and the polishing hydrocarbon absorber material is about 45% to 5% of the total absorber material.

In other embodiments having a greater wt % of polishing hydrocarbon absorber material as compared to high capacity hydrocarbon absorber material has been shown to improve the lifetime of the overall hydrocarbon in water purification system. In some of these embodiments the high capacity hydrocarbon absorber material represents from 15% to 45% wt of the total absorber material and the polishing hydrocarbon absorber material is about 85% to 55% wt of the total absorber material.

In some embodiments the hydrocarbon-in-water purification system has about ⅔ high capacity hydrocarbon absorber material and ⅓ polishing hydrocarbon absorber material. The high capacity hydrocarbon absorber material represents from 60 to 75 wt % of the total absorber material (contained within the hydrocarbon-in-water purification system) and the polishing hydrocarbon absorber material is about 40% to 25% of the total absorber material.

As used herein, terms such as "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device.

Some of the advantages of the disclosed systems and constructions are further illustrated by the following example. The particular materials, amounts and dimensions recited in this example, as well as other conditions and details, should not be construed to unduly limit the present disclosure.

EXAMPLES

Example 1

A fuel-in-water emulsion was prepared by grinding 2.0 mL of B5 diesel fuel (5% biodiesel) in 500 mL of distilled water. An additional 1.0 L of distilled water was added to the emulsion. The bottom 1.0 L of this emulsion was gathered for testing. The hydrocarbon drops within the emulsion were visually determined to be between 2.8 and 12 micrometers in diameter with an average diameter of 6.4 micrometers.

GC-MS testing was used to determine the hydrocarbon content of this emulsion as follows. A sample of emulsion (5.0 mL) was combined with 5 N HCl (0.5 mL) and extracted in hexane (2.0 mL) for 1 hour. The hexane samples were diluted 1:10 and run by a standard GC-MS method. The MS signal was integrated and compared a calibration of a hexadecane (C16) standard. The emulsion sample contained 815 ppm hydrocarbons, which includes both dissolved and emulsified hydrocarbons.

Samples containing anion exchange resin were prepared by placing 1.0 g of resin in a vial with 10 mL of emulsion. Resin samples tested were Purolite A500, Purolite A100, and Purolite A103. A sample containing no anion exchange resin was prepared as a control. The next day the water samples from the Purolite A100 and Purolite A103 resins did not visibly contain an emulsion.

GC-MS experiments (performed as described above) found the hydrocarbon content of the control sample (no anion exchange resin) had decreased to 267 ppm due to settling/adsorption to the glass vial. The A100 and A103 resin samples did not contain any visible emulsion. The A100 and A103 samples each contained 19 ppm hydrocarbons, which were primarily dissolved hydrocarbons. A small "oil slick" was observed on the top of the water samples for these samples, indicating that after the emulsion broke, the fuel phase had migrated to the surface (as expected by its lower density).

Samples using A500 resin did not fully break the emulsion. The hydrocarbon content in the water samples was less than the control, but still contained a visible emulsion. Results are reported in Table 1.

TABLE 1

Hydrocarbon Content in Ion Exchange Water Samples

| Sample | Hydrocarbon Content (ppm)[a] |
|---|---|
| Challenge Water | 815 |
| Control Sample (no Ion Exchange Resin) | 267 |
| A100 (1.0 g) | 19 |
| A103 (1.0 g) | 19 |
| A500 (1.0 g) | 157 |

[a]Relative to hexadecane (C16) standard

Example 2

In a second example a concentrated fuel (B5)-in-water emulsion was exposed to a strong base anion exchange resin. The hydrocarbon concentration of the fuel-in-water emulsion was approximately 100,000 ppm. The addition of strong base anon exchange resin causes a distinct separation of the fuel and water into separate phases.

Example 3

A glass column was filled with 10 g of Purolite A500 anion exchange resin (available from Purolite Corp. Bala Cynwyd, Pa.). A hydrocarbon-in-water emulsion (hydrocarbon content=4697 ppm; hydrocarbon=B5 or 5% Biodiesel) was allowed to drain through the anion exchange bed. The hydrocarbon content was measured to be 494 ppm after the bed. The separation efficiency is 89%.

Example 4

A glass column was filled with 10 g of Purolite A103 anion exchange resin. A hydrocarbon-in-water emulsion (hydrocarbon content=3671 ppm; hydrocarbon=B5 or 5% Biodiesel) was allowed to drain through the anon exchange bed. The hydrocarbon content was measured to be 626 ppm after the bed. The separation efficiency is 83%.

Example 5

A glass column was filled with 10 g of Purolite A500 anion exchange resin. One liter of a hydrocarbon-in-water emulsion was prepared (initial hydrocarbon content=4107 ppm; hydrocarbon=B5 or 5% Biodiesel). The hydrocarbon-in-water emulsion was allowed to drain through the anon exchange bed. The initial efficiency for the first 200 mL was 77% (949 ppm leaving bed). The final efficiency for the last 200 mL was 92% (223 ppm leaving bed). During the experiment the flowrate decreased and a distinct fuel layer formed at the top of the anion exchange bed.

Example 6

A hydrocarbon-in-water emulsion was prepared with a soy-based biodiesel fuel (B100 or 100% biodiesel) having greater than about 5000 ppm hydrocarbon. The emulsion was placed in vials with several forms of basic anion exchange resin. The vials were allowed to sit statically for 18 hours. The emulsion samples containing basic anion exchange resin were clear after 18 hours, indicating that the emulsion had separated. The emulsion blank (Control sample) still contained an emulsion. An emulsion of B20

(20% biodiesel) was not separated by a strong acid cation exchange resin (Dowex DR-2030). Results are reported in Table 2.

TABLE 2

| Ion Exchange Resin | Hydrocarbon | Form | Visibly Broke Emulsion |
|---|---|---|---|
| Purolite A100 | B100 | Weak Base Anion | Yes |
| Purolite A103 | B100 | Weak Base Anion | Yes |
| Purolite A500 | B100 | Strong Base Anion (Cl⁻ Form) | Yes |
| Dowex DR-2030 | B20 | Strong Acid Cation (H⁺ Form) | No |

Example 7

Water condensate from an air-oil separator on a compressor was collected. The water was white and hazy with a hydrocarbon emulsion. The hydrocarbons are likely from the compressor oil, which was AEON 4000 (available from Gardner Denver) in this compressor system. AEON 4000 is a hydrotreated mineral oil containing a proprietary additive package available from a variety of commercial dealers. The water condensate (hydrocarbon-in-water emulsion) was placed in a vial with Purolite A500 anion exchange resin. After 18 hours the emulsion had separated and the water was visibly clear. A control sample containing only the water condensate did not separate during this time.

Example 8—High Capacity/Polishing Two-Stage Hydrocarbon Absorber Stage

The Freundlich Isotherm constants, $K_f$ and $1/n$, are fitting constants that indicate the extent of interaction between the adsorbate and adsorbent. In this example the filter is designed to remove diesel hydrocarbons from water. In a typical experiment the adsorbent properties of various materials were determined as follows. Various masses of each material (50 mg-500 mg) were challenged with 20 mL of a B5 diesel fuel-in-water dispersion (typically 1000-2500 ppm hydrocarbon content). The samples were equilibrated overnight and the equilibrium hydrocarbon concentration for each sample was determined using GC-MS (Gas Chromatography-Mass Spectrometry) relative to an n-hexadecane (C16) standard. The data was worked up using a linearized form of the empirical Freundlich isotherm expression:

$$\log_{10} q = \log_{10} \frac{x}{m} = \log_{10} K_f + \frac{1}{n} \log_{10} c_e$$

where q is the adsorbent loading in mg of hydrocarbons/g adsorbent (x/m), $c_e$ is the equilibrium hydrocarbon concentration in the water, and $K_f$ and $1/n$ are the isotherm parameters that are material dependent and temperature dependent. In a multi-component adsorbate, such as diesel fuel, the isotherm parameters tended to be dependent on the initial fuel-in-water dispersion concentration. Isotherms constants and capacity values for a variety of materials are presented in Table 3 (materials challenged with 2500 ppm B5 diesel fuel-in-water dispersion) and Table 4 (materials challenged with 1000 ppm B5 diesel fuel-in-water dispersion).

TABLE 3

Freundlich Isotherm Constants for Materials Challenged with 2500 ppm B5 Diesel Fuel-in-Water dispersion

| | Freundlich Isotherm Constants | | Material Capacity (mg hydrocarbon/gram material) | |
|---|---|---|---|---|
| | | | Polishing, $q_t$ | Saturation, $q_{sat}$ |
| Material | Log $K_f$ | $1/n$ | ($c_e$ = 2 ppm) | ($c_e$ = 2500 ppm) |
| Norit GCN 1240 | 1.29 | 0.43 | 26.4 | 568 |
| Silcarbon K48 | 0.00 | 0.86 | 1.8 | 854 |

TABLE 4

Freundlich Isotherm Constants for Materials Challenged with 1000 ppm B5 Diesel Fuel-in-Water dispersion

| | Freundlich Isotherm Constants | | Material Capacity (mg hydrocarbon/gram material) | |
|---|---|---|---|---|
| | | | Polishing, $q_t$ | Saturation, $q_{sat}$ |
| Material | Log $K_f$ | $1/n$ | ($c_e$ = 2 ppm) | ($c_e$ = 1000 ppm) |
| Chemviron Carbsorb 28FB | 1.54 | 0.40 | 45.7 | 561 |
| Polyurethane foam (Restek; Catalog #22957) | −2.69 | 2.08 | 0.0[a] | 3686 |

[a] The polyurethane foam cannot purify water down to 2 ppm, according to the Freundlich Isotherm parameters.
Norit GCN 1240 is commercially available from Cabot Corporation (Boston, MA).
Silcarbon K48 is commercially available from Silcarbon Aktivkohle GmbH (Kirchhundem, Germany).
Chemviron Carbosrb 28FB is commercially available from Chemviron Carbon (Feluy, Belgium).

Example 8A

The adsorbent properties of a high capacity carbon (Silcarbon K48) and a polishing carbon (Norit GCN 1240) were determined by running an isotherm experiment as described previously. Isotherm parameters for a 2500 ppm B5 diesel fuel-in-water dispersion challenge are presented in Table 1. The target cleanliness for this example is 2 ppm.

As observed, the Silcarbon K48 carbon has a higher saturation capacity, whereas the Norit GCN 1240 carbon has a higher loading capacity when targeting an outlet hydrocarbon concentration of 2 ppm. Therefore, a hydrocarbon in water purification system including a Silcarbon K48 high capacity stage followed by a Norit GCN 1240 polishing stage will have a longer lifetime than an equal mass system having only Norit GCN 1240 polishing carbon.

By breaking the absorbent bed into two stages, where the first uses a high capacity material and the second stage uses a polishing material, we can increase the lifetime of a water purification filter. Calculated results verify this increase in lifetime when the bed is challenged sequentially with 50 mL water samples that have an initial hydrocarbon concentration of 2500 ppm. In this model the water and carbon are allowed to equilibrate completely according to the Freundlich Isotherm expression before being transferred to the next filter stage or by leaving the element. The Freundlich isotherm parameters for the high capacity material and polishing material are based off of isotherm experiments using diesel fuel-in-water dispersion challenge (Table 1). This model was used in all examples. In this example both materials were activated carbons.

A filter containing 357 g of Norit GCN 1240 will purify 68 L of water before breaking through the target concentration of 2 ppm. By breaking the filter into two stages of Silcarbon K48 (high capacity) and Norit GCN1240 (polishing) the optimal lifetime in the multi-batch model is 60% by weight high capacity carbon, and 40% by weight polishing carbon. In this ratio the will purify 82 L before breakthrough at 2 ppm. This is a 21% increase in hydrocarbon absorber filter lifetime.

Example 8B

In another example of high capacity materials, a typical polishing carbon was compared to a polyurethane foam (Restek; Catalog #22957). The polyurethane and polishing carbon were challenged with 1000 ppm hydrocarbons (B5) in water dispersion to determine the Freundlich Isotherm parameters Log K and 1/n (Table 2). From these values the loading at saturation and at a target cleanliness (polishing) are computed. Here the target cleanliness is 2 ppm hydrocarbons in water. From experimental data, the Restek polyurethane cannot purify the water down to the intended cleanliness alone ($q_t=0$ mg hydrocarbons/g material). In contrast, the typical polishing carbon has a capacity of $q_t=45.7$ mg hydrocarbon/gram of carbon at the 2 ppm target cleanliness.

The Restek polyurethane has a significantly higher saturation capacity than the polishing carbon (Restek polyurethane: $q_{sat}=3686$ mg hydrocarbons/g material; polishing carbon: $q_{sat}=561$ mg hydrocarbons/g material). Thus a two-stage filter having a high-capacity polymer stage followed by a polishing carbon has a longer expected lifetime than a filter of carbon alone.

For example, in a multi-batch application (challenge water=1000 ppm hydrocarbons in water) a calculated lifetime of a 250 g polishing carbon element is 112 L of before breaking through the target concentration of 2 ppm. A filter element designed using 50 g of Restek polyurethane followed by 200 g of polishing carbon has a calculated lifetime to 132 L before breakthrough. This is an 18% increase in hydrocarbon absorber filter lifetime.

The order of the absorbent stages is important to increase the overall lifetime of the hydrocarbon in water purification system. If the stages in the previous example are reversed (200 g polishing carbon followed by 50 g of Restek polyurethane) the lifetime of the system is decreased to 80 L before breakthrough. This is a 29% decrease in hydrocarbon absorber filter lifetime.

Thus, embodiments of HYDROCARBON-IN-WATER PURIFICATION ANION-EXCHANGE SYSTEM are disclosed. One skilled in the art will appreciate that the systems and methods described herein can be practiced with embodiments other than those disclosed. The disclosed embodiments are presented for purposes of illustration and not limitation.

The invention claimed is:

1. A hydrocarbon-in-water purification system for breaking a hydrocarbon-in-water emulsion and separating hydrocarbons from water, comprising:
an anion exchange stage comprising an anion exchange resin and an inlet and a water permeate outlet and a hydrocarbon outlet, the inlet is configured to be in fluid communication with a hydrocarbon-in-water emulsion source;
a high-capacity hydrocarbon absorber stage in liquid communication with the water permeate outlet and downstream of the anion exchange stage, the hydrocarbon absorber stage comprising high capacity material having a saturation capacity greater than 750 mg of hydrocarbon per gram of material; and
a polishing absorber stage downstream of the high capacity hydrocarbon absorber stage, wherein the polishing absorber stage comprises polishing material having a polishing capacity greater than 25 mg of hydrocarbon per gram of material.

2. The system according to claim 1 wherein the anion exchange resin comprises a strong base anion exchange resin.

3. The system according to claim 2 wherein the hydrocarbon-in-water emulsion comprises an anionic surfactant.

4. An engine fuel and water separation system comprising:
a fuel and water separator system configured to be fluidly connected to an engine fuel line and having a water drain outlet; and
the inlet of the hydrocarbon-in-water purification system, according to claim 3, in fluid communication with the water drain outlet.

5. The system according to claim 3 wherein the high-capacity hydrocarbon absorber stage comprises activated carbon.

6. The system according to claim 1 wherein the hydrocarbon-in-water emulsion comprises an anionic surfactant.

7. The system according to claim 1 wherein the hydrocarbon-in-water emulsion comprises hydrocarbon droplets having an average diameter of 5 micrometers or greater.

8. The system according to claim 1 wherein the hydrocarbon-in-water emulsion comprises fuel.

9. The system according to claim 1 wherein the hydrocarbon-in-water emulsion comprises diesel.

10. The system according to claim 1 wherein the hydrocarbon-in-water emulsion comprises biodiesel.

11. The system according to claim 1, further comprising a hydrocarbon-in-water emulsion source, wherein the hydrocarbon-in-water emulsion source is a fuel system.

12. The system according to claim 1, further comprising a hydrocarbon-in-water emulsion source, wherein the hydrocarbon-in-water emulsion source comprises a compressor.

13. An engine fuel and water separation system comprising:
a fuel and water separator system configured to be fluidly connected to an engine fuel line and having a water drain outlet; and
the inlet of the hydrocarbon-in-water purification system, according to claim 1, in fluid communication with the water drain outlet.

14. An oil/water separator system comprising:
an oil/water reservoir vessel; and
the inlet of the hydrocarbon-in-water purification system, according to claim 1, fluidly connected to the oil/water reservoir vessel.

15. A method comprising:
passing a hydrocarbon-in-water emulsion through an anion exchange element comprising an anion exchange resin to break the emulsion and allow the hydrocarbon phase to separate from a permeate that is substantially water;
removing the permeate from the anion exchange element;
contacting the permeate with a high-capacity hydrocarbon absorbing material having a saturation capacity greater than 750 mg of hydrocarbon per gram of material to form an outlet stream; and contacting the outlet stream with a polishing material having a polishing capacity greater than 25 mg of hydrocarbon per gram of material to form a polished water stream.

16. The method according to claim 15 wherein the hydrocarbon-in-water emulsion comprises at least 500 hydrocarbon and having a hydrocarbon droplet average diameter greater than 5 micrometers, and the permeate comprises less than 25% of the hydrocarbon of the hydrocarbon-in-water emulsion.

17. The method according to claim 15 wherein the hydrocarbon-in-water emulsion comprises diesel fuel and an anionic surfactant.

* * * * *